(12) United States Patent
Nelson

(10) Patent No.: US 6,762,671 B2
(45) Date of Patent: Jul. 13, 2004

(54) TEMPERATURE SENSOR AND METHOD OF MAKING AND USING THE SAME

(75) Inventor: Charles Scott Nelson, Clio, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/280,168

(22) Filed: Oct. 25, 2002

(65) Prior Publication Data

US 2004/0080394 A1 Apr. 29, 2004

(51) Int. Cl.$^7$ .............................................. H01L 3/04
(52) U.S. Cl. ........................ 338/25; 338/28; 374/185; 374/208
(58) Field of Search ................... 338/25, 28; 374/185, 374/208

(56) References Cited

U.S. PATENT DOCUMENTS

| | | | | |
|---|---|---|---|---|
| 5,142,466 | A | * | 8/1992 | Foster et al. ............... 362/368 |
| 5,430,428 | A | | 7/1995 | Gerblinger et al. |
| 5,610,571 | A | * | 3/1997 | Kuzuoka ................. 338/22 R |
| 5,735,606 | A | * | 4/1998 | Tani et al. .................. 374/185 |
| 5,831,512 | A | * | 11/1998 | Wienand et al. ............. 338/25 |
| 6,014,073 | A | * | 1/2000 | Torii et al. ................... 338/25 |
| 6,227,033 | B1 | | 5/2001 | Kainz |
| 6,353,381 | B1 | * | 3/2002 | Dietmann et al. ........... 338/25 |
| 6,382,198 | B1 | | 5/2002 | Smith et al. |
| 6,453,726 | B1 | | 9/2002 | Gutierrez et al. |
| 6,484,561 | B2 | | 11/2002 | Jackson et al. |
| 6,514,397 | B2 | | 2/2003 | LaBarge et al. |
| 6,544,467 | B2 | | 4/2003 | Symons et al. |
| 6,562,747 | B2 | | 5/2003 | Symons et al. |
| 6,579,435 | B2 | | 6/2003 | Wang et al. |
| 6,579,436 | B2 | | 6/2003 | Wang et al. |
| 6,585,872 | B2 | | 7/2003 | Donelon et al. |

FOREIGN PATENT DOCUMENTS

| | | | | |
|---|---|---|---|---|
| DE | 3603757 A1 | | 11/1987 | |
| GB | 7353164 | * | 8/1955 | ................. 338/28 |
| GB | 1440393 | * | 6/1976 | ................. 338/28 |
| GB | 1454816 | * | 11/1976 | ................. 338/28 |
| GB | 2 171 253 A | | 2/1986 | |
| JP | 63269502 | | 11/1988 | |

OTHER PUBLICATIONS

English Abstract for DE3603757A1.
English Abstract for JP63269502.

* cited by examiner

*Primary Examiner*—Karl D. Easthom
(74) *Attorney, Agent, or Firm*—Jimmy L. Funke

(57) ABSTRACT

Provided for herein is a temperature sensor and methods of making and using the same. In one embodiment, the temperature sensor comprises: a cover plate disposed at a first end of a substrate to form an interface portion; a sensing element disposed between the cover plate and the substrate to form an assembly; wherein the cover plate and substrate have relative dimensions so as to form a ledge at the first end; and wherein the cover plate is attached to the substrate at the ledge.

In anther embodiment, the temperature sensor comprises: a cover plate disposed at a first end of a substrate to form an interface portion, a sensing element disposed between the cover plate and the substrate to form an assembly, and a seal disposed to inhibit fluid communication between the sensing element a gas to be temperature sensed, wherein fluid communication is retained between the sensing element and an external environment.

14 Claims, 4 Drawing Sheets

TEMPERATURE SENSOR AND METHOD OF MAKING AND USING THE SAME

BACKGROUND

Temperature sensors are used in a wide variety of applications across many different disciplines. For example, high temperature resistance temperature detector (RTD) sensors are used in emission-control systems used with internal combustion engines because they can detect changes in temperature with time constants on the order of about 10 seconds or less as is required in that type of application. However, not all temperature sensors are suitable for use in emission control systems.

To measure temperatures up to about 1,000° C., thermocouples that use platinum/platinum-rhodium or nickel/chromium-nickel or the like have been used. These devices however, are prone to becoming poisoned when exposed to an exhaust gas at high temperature; they also have relatively long response times to temperature changes, since they must be of a large diameter for durability purposes.

To improve the response times of RTD sensors, temperature sensors comprising platinum group metals have been screen-printed or produced using other thin-film technologies onto various ceramic substrates. While the response times of such thin film sensors are improved compared to thermocouples, such thin-film sensors are only suitable for use at temperatures up to a maximum of about 850° C., wherein these sensors become unstable during operation. The stability of a sensing element may also be affected by poisoning of the sensing element like that which can occur when a platinum sensing element comes in contact with materials such as silicon, lead, and the like, all of which may be present in exhaust gases from an internal combustion engine.

Approaches directed to increasing the maximum temperature at which a thin film platinum group metal temperature sensor may be used include protecting the temperature sensor from oxidation and other effects by covering the sensor element with a protective cover plate, also referred to as a protective layer or passivation layer. A cover plate may comprise a single layer, or multiple layers of a heat-resistant ceramic material. Examples include GB 2 171 253, which is directed to a temperature sensor made of platinum metal that is provided with an aluminum oxide protective layer. JP-A 63269502 discloses a platinum resistance film having a silicon nitride protective layer. German Offenlegungsschrift 36 03 757 is directed to protecting a platinum sensor with a titanium dioxide/silicon dioxide double layer.

Also, to provide protection of the sensing element, the cover plate can be hermetically sealed from the exhaust gas or other harmful environments. By hermetically sealed it is meant that the sensing element is encased behind the cover plate so that an essentially impermeable barrier is formed between the sensing element and the environment. If there is a leak that allows contact between the exhaust gas and the sensing element, even through a small pinhole, poisons contained within the exhaust gas can seep in and change the response characteristics of the sensing element causing instability.

Another approach of providing an impermeable seal around a sensing element is disclosed in U.S. Pat. No. 5,430,428 to Gerblinger et al., wherein a double layer passivation layer is disposed over a platinum resistive layer (i.e., a sensing element) to prevent oxidation of the element. The double layer includes a ceramic layer (i.e., a cover plate) and a glass layer that are both disposed directly over a substrate to which the sensing element is attached. As such, the sensing element is encased within a layer of glass between a substrate and a cover layer. This approach, however, can allow poisons to diffuse through the glass to the sensing element under high temperature conditions wherein the glass becomes permeable to poisons present in exhaust gases.

Another approach to providing an impermeable seal around a sensing element is to provide a glass seal between a substrate and a cover plate around the sides of the cover plate and the corresponding sides of the substrate on which the sensing element is disposed. However, this approach can interrupt or sever physical and thermal contact between the cover plate and the sensing element, which increases response times of the sensor. Also, to attach only the edges of the cover plate to only the edges of the substrate, the two pieces are held together while a bead of glass slurry is disposed onto the edges of both the substrate and cover plate, both being of equal dimension. Heating followed by cooling causes the glass to melt and then harden, thereby sealing the cover plate to the sensing element substrate. Difficulties experienced while applying glass to the sides of the element without the various parts moving during the application have limited the effectiveness of the this approach.

Furthermore, in this and similar approaches, gravity can cause the glass slurry to become deformed and flow prior to it being fired and then cooled into a solid. Thus, if the element is positioned such that the side where the glass slurry is being applied is horizontal (so as not to be affected by gravity), the element must be positioned and then repositioned prior to application of the glass slurry to each side of the cover plate-substrate interface. Such manipulation during the process leads to an increase in process time and complexity.

Another attempt at protecting the sensing element from a harmful environment includes packaging the entire RTD temperature sensor within a protective sheath which is vented to the atmosphere. However, such an approach is detrimental to response time, often resulting in a response time three to four times longer than the same temperature sensor without the protective sheath.

Accordingly, there remains a need in the art for a stable temperature sensor having relatively fast response times that is protected from poisons. This need includes a temperature sensor that can be produced without undue complexity and processing time.

SUMMARY

Disclosed herein is a temperature sensor and methods of making and using the same. In one embodiment, the temperature sensor comprises: a cover plate disposed at a first end of a substrate to form an interface portion; a sensing element disposed between the cover plate and the substrate to form an assembly; wherein the cover plate and substrate have relative dimensions so as to form a ledge at the first end; and wherein the cover plate is attached to the substrate at the ledge.

In another embodiment, the temperature sensor comprises: a cover plate disposed at a first end of a substrate to form an interface portion, a sensing element disposed between the cover plate and the assembly, and a seal disposed to inhibit fluid communication between the sensing element a gas to be temperature sensed, wherein fluid communication is retained between the sensing element and an external environment.

In one embodiment, the method of making a temperature sensor comprises: disposing a cover plate over a first end of a substrate comprising a sensing element such that the sensing element is located between the substrate and the cover plate to form an assembly, wherein the cover plate and substrate have relative dimensions so as to form a ledge at the first end, and attaching the cover plate to the substrate at the ledge.

In another embodiment, the method of making a temperature sensor comprises: disposing a cover plate over a first end of a substrate comprising a sensing element such that the sensing element is located between the substrate and the cover plate, and attaching the cover plate to the substrate to form a seal that is capable of inhibiting fluid communication between the sensing element and a gas to be temperature sensed, wherein the sensing element is in fluid communication with an external environment.

The above described and other features are exemplified by the following figures and detailed description.

DRAWINGS

Referring now to the figures, which are exemplary embodiments, and wherein the like elements are numbered alike:

DETAILED DESCRIPTION

This disclosure relates to temperature sensors. Particularly discussed are planar resistance temperature detectors (RTD) for use at high temperatures (i.e., temperatures greater than or equal to about 600° C.). By way of example, a rectangular temperature sensor is depicted in the figures that are described herein. However, the shape of the sensor may be any geometric shape or combination of geometric shapes and need not be rectangular to fall within the scope of the instant disclosure and the scope of the appended claims. It should also be noted, that although described in relation to sensing exhaust gas temperatures, e.g., for automotive applications, the temperature sensor can be applied in various areas desiring temperature sensing, including aerospace, industrial (e.g., in furnaces, flues, and the like), and elsewhere.

Figure 1:
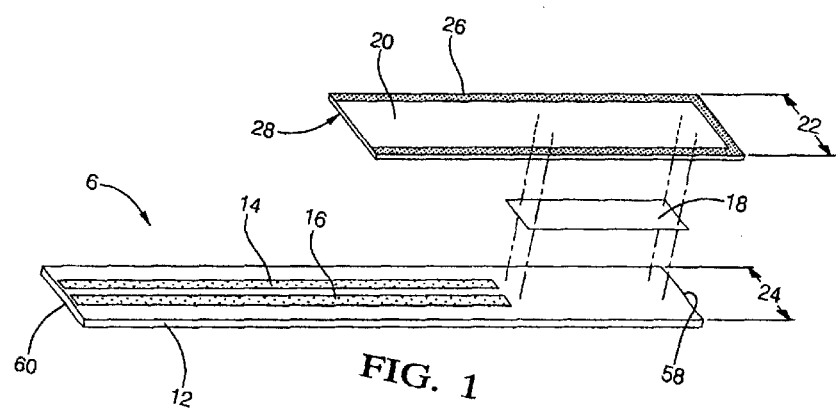
FIG. 1 is an exploded perspective view of one embodiment of a temperature sensing element.
Figure 2:
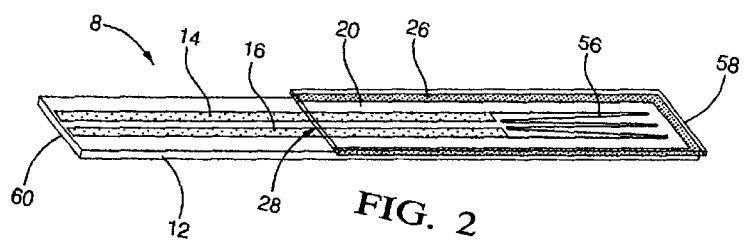
FIG. 2 is a perspective schematic representation of the sensing element of FIG. 1, after trimming of the sensing element, illustrating the cover plate in outline only.
Figure 3:
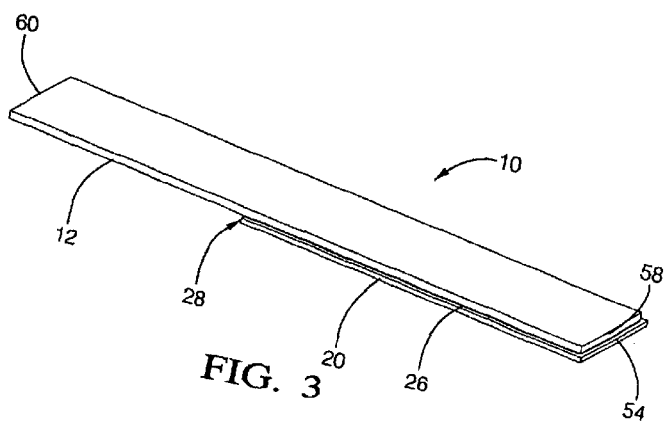
FIG. 3 is a perspective view of the temperature sensing element of FIG. 1 after assembly.

Referring to FIGS. 1–3, the temperature sensor 8 comprises a sensing element 56 disposed on a first side of a substrate 12 in operable communication with conductors 14 and 16 also disposed on the first side. A cover plate 20 is disposed over the sensing element 56 and preferably over at least a portion of the conductors 14 and 16, extending from a sensing end of the substrate 58 toward a second end 60. The area between the cover plate 20 and the substrate 12, around the sensor element 56, is sealed on three sides, the side at the sensing end 58, and the two sides abutting the sensing end. Meanwhile, at least a portion of the cover plate 20 of the side opposite the sensing end 58, that is, the side of the cover plate closest to the second end 60, is not sealed and forms an opening 28.

Figure 4:
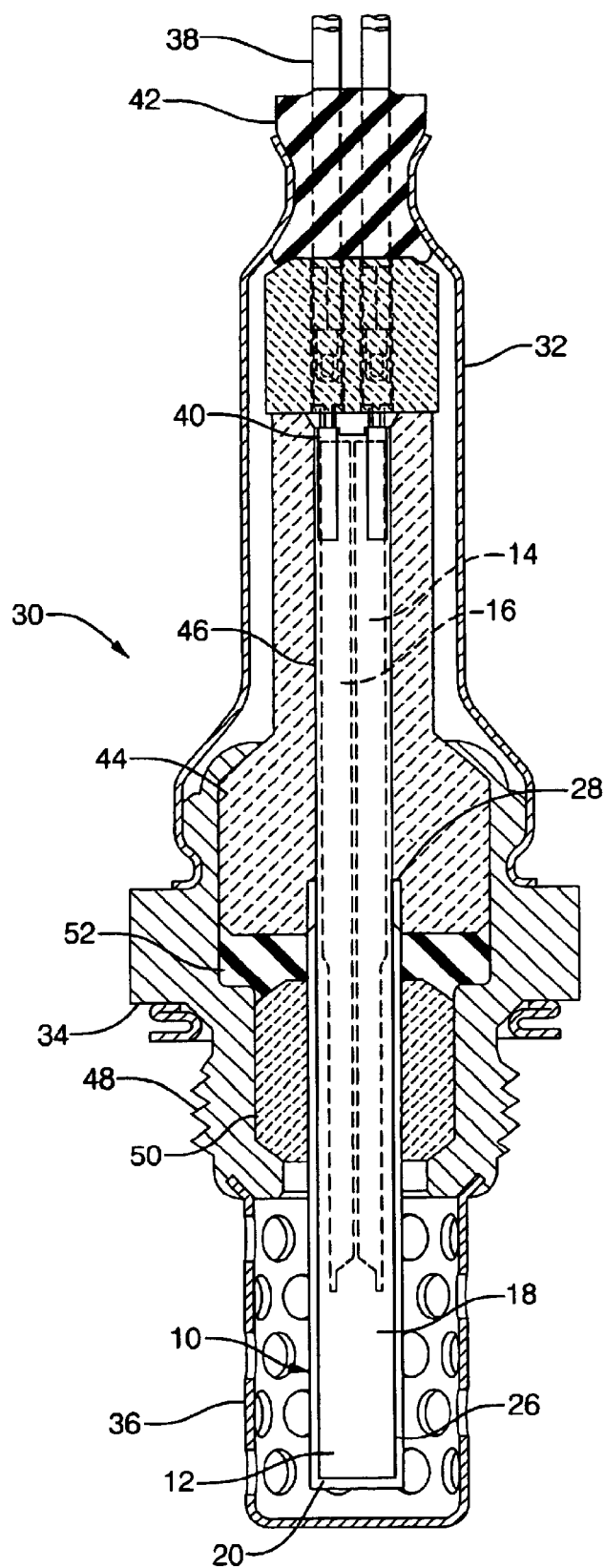
FIG. 4 is a cross-sectional frontal view of one embodiment of a temperature sensing element disposed within a package.
Figure 5:
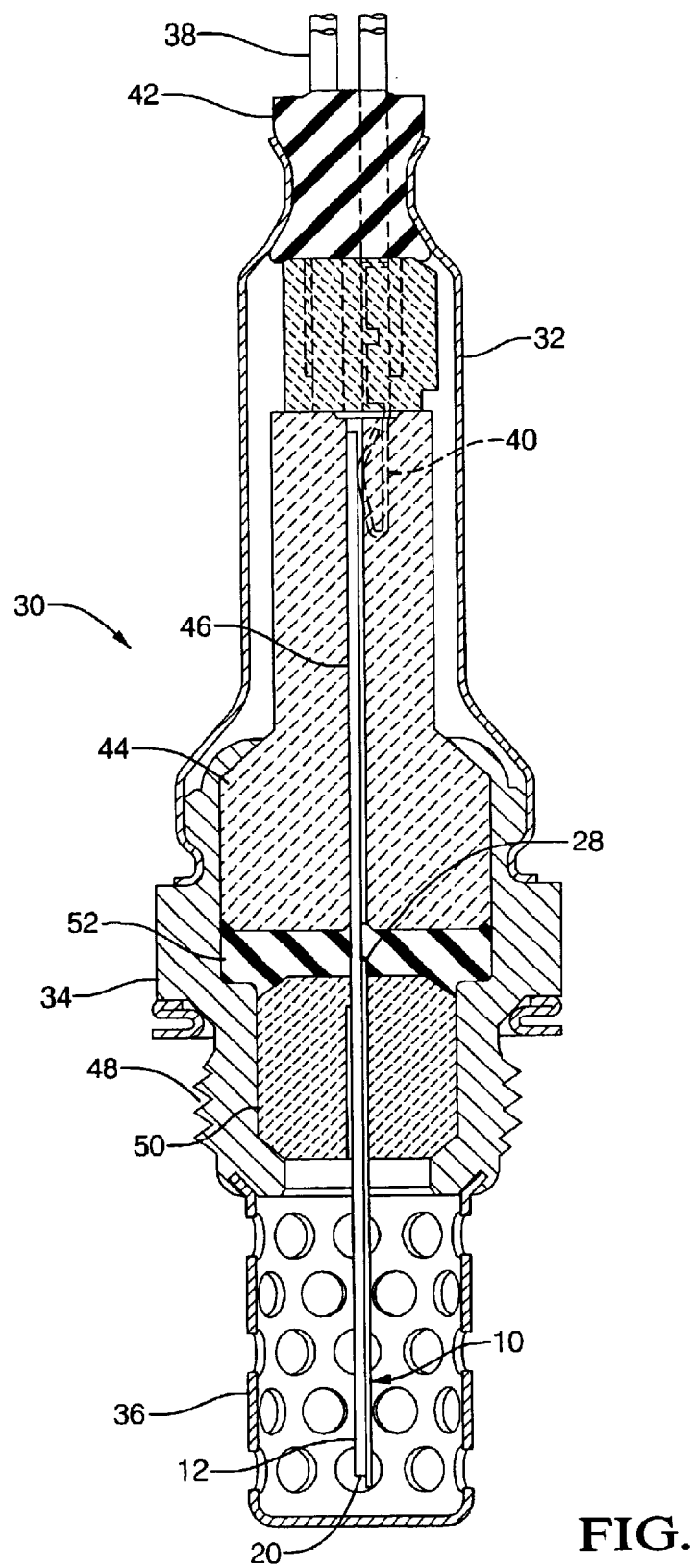
FIG. 5 is a cross-sectional side view of the temperature sensing element disposed within the package FIG. 4.
Figure 6:
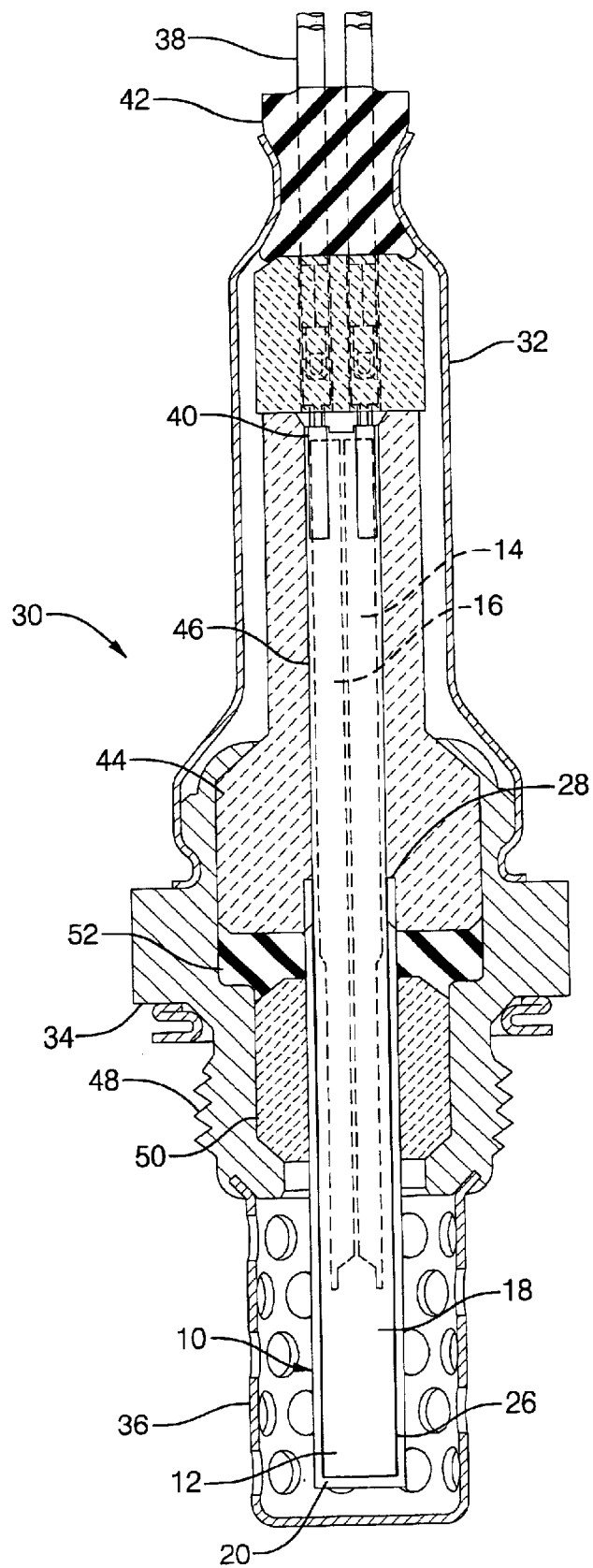
FIG. 6 is an alternative embodiment of FIG. 4.

Referring to FIGS. 4–6, the sensor 10 is disposed in a housing 30 such that the sensing end 58 extends out of the housing into a cover 36 capable of fluid communication with the environment to be sensed, while the second end 60 is disposed within the housing. Within the housing, various materials may be employed to maintain the sensor in place and to provide structural integrity and protection against contaminants. Generally, the sensor extends through a sealed portion comprising sealing material 52 (e.g., talc, magnesium oxide, or any compressible powder capable of withstanding temperatures of at least 600° C., or the like), and into a portion that preferably comprises a support material, (e.g., a metal, ceramic, formed ceramic, a mat material (e.g., a mesh), or any substrate that acts to hold the sealing material in place), such that when installed, the conductors can be connected to wires that will extend through an end of the housing opposite the cover. To prevent exposure of the sensing element to possible contaminants in the gas to be sensed, the open side 28 of the cover plate 20 preferably extends up into or completely through the sealing material 52. Thus, the sealing material prevents the exhaust gas from contacting the conductors and the portion of the substrate disposed within the housing, including a wiring harness and contacts that are typically disposed that the second end of the substrate. The three sealed sides of the cover plate 20 may be attached to or otherwise sealed to the substrate 12 using glass, densified alumina, ceramic, and/or other sealing material 26 applied as a slurry and then fired (See FIGS. 1–3).

It has been discovered that, by appropriately sizing the cover plate 20, the cover plate and the substrate 12 may be attached together without the sealing material 26 being effected by gravity, and therefore without requiring the sensing element to be moved or repositioned during attachment of the cover plate. Consequently, the cover plate preferably has a dimension and is positioned to overhang 54 at least the sensing end, and preferably at least the portion of the sides of the substrate over which the cover plate is disposed that may contact the gases whose temperature will be sensed. In other words, the size of the cover plate is preferably selected to be wider than the portion of the substrate it covers. This allows for the sensing element to be positioned over and placed on top of the cover plate such that the cover plate extends slightly past the tip and surrounding sides of the sensor (i.e., the end of the sensing end, opposite the second end), creating a ledge formed from the cover plate (e.g., on at least one of the sides of the sensor). In an alternative embodiment, the substrate may be wider than the cover plate such that the ledge formed is on the substrate and not on the cover plate. The glass slurry is then preferably applied to the ledge and the sensor is fired.

The sensing electrode may be disposed on the substrate using various thick film deposition techniques (i.e., a thickness greater than or equal to about 2 micrometers), wherein a film of sensing electrode material is disposed as a layer or series of layers on a substrate and/or the sensing material is disposed in a rough patterned configuration. The thickness need not be uniform over the entirety of the layer. The sensing electrode may also be disposed using a thin film technique such as screen-printing of a conductive material onto the substrate. A combination comprising at least one of the above mentioned deposition processes may also be used. The preferred method employs a thin film deposition process for one portion of the sensing element (e.g., the resistive portion 56), and a thick film deposition process for other portions of the sensing element (e.g., the leads (14 and 16) to and from the resistive portion (56) of the sensing element). The element is then fired. Next, the sensing element material (and also the lead material) may be configured using a trimming device such as a laser, followed by a refiring process and optionally a fine-tuning procedure to obtain the desired sensing element configuration. The preferred method allows immediate resistance feedback and adjustment in a cost effective and simple system.

Referring again to FIG. 1, temperature sensor 6 has a layer of sensor material 18 disposed over a substrate 12. The substrate 12 may be a ceramic material. Preferably, the substrate 12 comprises zirconia, alumina, or a combination comprising at least one of the foregoing. More preferably, the substrate is a 99.5% pure alumina. The substrate 12 may be in a green state or in a prefired state when the sensing element material is disposed thereon.

The sensing element material preferably has a high thermal coefficient of resistance, i.e., greater than or equal to about 800 parts per million (ppm); a high natural resistivity, i.e., greater than or equal to about 5 micro-ohm-centimeters; is stable at high temperatures, i.e., greater than or equal to about 600° C.; and exhibits stability over time at high temperatures (e.g., for longer than about 100 hours at 950° C.). Preferred materials include, but are not limited to, platinum, rhodium, titanium, palladium and mixtures and alloys comprising at least one of the foregoing materials.

The sensing element may be formed from a layer 18, as illustrated in FIG. 1, or a combination of layers, or can be disposed in a patterned form. The patterned form is preferably selected to approximate the desired final configuration of the sensor element, e.g., as shown in FIG. 1.

When a green substrate is used, it is preferably fired (i.e., heated at a temperature and for a period of time sufficient to densify the material; that is, to remove organics to less than about 1 wt % of the fired substrate) subsequent to the deposition of the sensing elements and conductors (i.e., leads) and before further processing. The leads are preferably fired at or above about 1,300° C. for a period of at least about three hours. The organics free substrate is thus ready for further processing. Thin film deposition may then used to deposit the sensing film. The sensing layer 18 of the fired sensor may have a resistivity of about 2–3 ohms at 25° C. prior to further processing, with a desired resistance in the sensor element of greater than or equal to about 100 ohms at 0° C., with greater than or equal to about 200 ohms at 0° C. preferred. The preferred value depends on the final use and the desired signal to noise ratio of the system. For example, such relatively high resistance values (e.g., around 200 ohms) in the RTD are preferred for use in automotive systems due to other sources of resistance including wires, connections, and the like, to reduce errors caused by contributions to the overall resistance measured.

Further processing comprises forming the layer 18 into the desired sensing element 56. (See FIG. 2) One possible method of forming the sensing element 56 comprises mounting the fired substrate to a trimming device, preferably a laser-trimming device, e.g., a diode-pumped Nd:YAG laser. The trimming device preferably includes sufficient control processing to allow the device to measure resistance in material 18 to within ±0.20% and accept a first desired resistance value. The trimming device then ablates the layer to meet the required resistance value. Thus, the trimming device is utilized to cut a pattern in the layer 18 to produce the sensing element 56 having an elongated configuration such as a serpentine pattern, a spiral pattern, or the like. In doing so, the trimming process is employed to increase the resistance of material 18 into a sensing element 56 having a desired resistance value.

Following the trimming operation, the assembly may be refired to smooth jagged edges and burn out small particles left from previous processing. Refiring is preferably achieved by heating the assembly to a temperature of about 1,000° C. to about 1,600° C. for up to about fifteen hours or so, or until an inflection point in the resistance of the element is reached. After refiring, the assembly may then be subjected to a fine trimming process in which a further amount of material is ablated, if necessary, in order to obtain the desired resistance value in view of resistivity lost during refiring or to otherwise enhance the first trimming.

Following the refiring and fine trimming processes, cover plate 20 is attached over the sensing element to the substrate 12. The cover plate 20 is preferably a ceramic material such as alumina, zirconia, or a combination comprising at least one of the foregoing materials. To provide for quick response, the thermal mass of the protective layer is preferably maintained as low as possible.

As shown in FIGS. 1 and 3, cover plate 20 preferably has a width 22, which is larger than the width 24 of substrate 12. Preferably, the total width of the cover plate exceeds the total width of the substrate by an amount sufficient to serve as a ledge 54 to hold the glass slurry 26, which is subsequently fired to attach the cover plate 20 to the substrate 12.

To allow for a sufficient amount of overhang, the cover plate 20 may be about 105% to about 150% larger in size than of portion of the substrate over which it is disposed (i.e., an interface portion). Preferably, within this range, the size of the cover plate is less than or equal to about 140%, more preferably less than or equal to about 130% of the size of the corresponding portion of the substrate. Also within this range the size of the cover plate is greater than or equal to about 110%, more preferably greater than or equal to about 120% the size of the corresponding portion of the substrate. For example, a portion of a substrate over which the cover plate is disposed has a surface area of 135 square millimeters ($mm^2$) and a cover plate has a surface area of 150 $mm^2$ would result in a cover plate being 111% larger than the corresponding portion of the substrate (e.g., 150/135*100%=111%).

Also, to allow for a sufficient amount of overhang, the cover plate 20 may have a width of about 105% to about 150% of the width of the substrate over which it is disposed. Preferably, within this range, the width of the cover plate is less than or equal to about 140%, more preferably less than or equal to about 130% of the width of the substrate. Also within this range the width of the cover plate is greater than or equal to about 110%, more preferably greater than or equal to about 120% the width of the substrate. For example, a substrate width of 4.5 millimeters (mm) and a cover plate width of 5 mm would result in a cover plate having a 111% width of the substrate (e.g., 5.0/4.5*100%=111%).

Preferably, the cover plate 20 is thinner than the substrate. Accordingly, the cover plate 20 may have a thickness of about 10% to about 90% of the thickness of the substrate over which it is disposed. Preferably, within this range, the thickness is less than or equal to about 80%, more preferably less than or equal to about 70% of the thickness of the substrate. Also within this range the thickness can be greater than or equal to about 40%, more preferably greater than or equal to about 50% the thickness of the substrate.

In another embodiment, the portion of the substrate disposed over the cover plate may be about 105% to about 150% larger in size than the cover plate over which it is disposed (i.e., an interface portion). Preferably, within this range, the size of the portion of the substrate is less than or equal to about 140%, more preferably less than or equal to about 130% of the size of the corresponding portion of the cover plate. Also within this range the size of the substrate is greater than or equal to about 110%, more preferably greater than or equal to about 120% the size of the corresponding portion of the cover plate. For example, the cover plate has a surface area of 135 square millimeters ($mm^2$) and a portion of the substrate disposed over the cover plate has a surface area of 150 $mm^2$ would result in a portion of the substrate being 111% larger than the corresponding cover plate (e.g., 150/135*100%=111%).

Also, to allow for a sufficient amount of overhang, the portion of the substrate disposed over the cover plate may have a width of about 105% to about 150% of the width of the cover plate. Preferably, within this range, the width of the portion of the substrate is less than or equal to about 140%, more preferably less than or equal to about 130% of the width of the cover plate. Also within this range the width of the portion of the substrate is greater than or equal to about 110%, more preferably greater than or equal to about 120% the corresponding width of the cover plate. For example, a cover plate width of 4.5 millimeters (mm) and a substrate width of 5 mm would result in a substrate having a 111% width of the cover plate (e.g., 5.0/4.5*100%=111%).

The cover plate is attached to the substrate by disposing a line or bead of a glass slurry 26 on the ledge 54 formed by the overlap of the cover plate 20. The glass slurry or other sealing material is not applied to at least a portion of the interface between the cover plate 20 and the substrate 12 such that an open portion 28 is formed. The assembly is then fired at a temperature and for a period of time sufficient to attach and seal the cover plate onto the substrate. Preferably, the glass is applied in an amount so as to hermetically seal the cover plate to the substrate, and in such as way that the glass does not come in contact with the sensing element prior to, or after the cover plate is attached.

To allow the sensor to be used in measuring temperature of a gas, the temperature sensor is preferably disposed within a package that allows for the portion of the cover plate not sealed to the substrate to be in fluid contact with the external atmosphere, while being isolated from the gas being measured. Referring to FIG. 4 and to FIG. 5, which is a side view of FIG. 4, sensor 10 is disposed within package 30, which includes a housing structure generally formed of an upper shield 32, a lower shield 36, and a shell 34. A terminal connector 42 and a portion of a sensing element 10 are disposed within upper shield 32. Terminals 40 contact external pads, preferably using spring terminals, to provide electrical connection between electric wires 38, and sensing element 10. The use of spring terminals disposed on the end of the sensing element 10 also assists in securely maintaining electrical contact therewith. The inner insulator 44 disposed within upper shield 32 has a centrally located annular opening 46 sized to allow insertion of sensing element 10 there through.

Shell 34 includes a body portion preferably shaped to accommodate a wrench or other tool for tightening a threaded portion 48 into a mount for an exhaust pipe or other component of an exhaust flow system to enable a portion of sensing element 10 to be located within a flow of material to be sensed (e.g., the measurement of an exhaust gas temperature). Preferably, shell 34 is coupled to upper shield 32 by being crimped thereto during the assembly process. Accordingly, shell 34 holds inner insulator 44 in a compressive force engagement. Also disposed with shell 34 is lower insulator 50 through which a portion of sensor element 10 is located. Disposed between inner insulator 44 and lower insulator 50 is a layer of inert sealing material 52, preferably comprising talc, magnesium oxide, or a similar sealing material. The open end of the sensor 28 may be in contact with the sealing material 52 such that the sealing material allows fluid communication between the unsealed end 28 of cover plate 20, and an external environment. In the preferred embodiment, as shown in FIG. 6, the unsealed end 28 of cover plate 20 does not terminate within the layer of sealing material 52, but extends through sealing material into a cavity or other space disposed within upper insulator 44, annular space 46, or a combination comprising at least one of the foregoing to provide fluid communication between the sensing element and an external environment.

Accordingly, by selecting an appropriate size and dimension of the cover plate so that a portion of the cover plate overhangs the sides of the substrate, the cover plate can be attached to the substrate such that the sealing material is not affected by gravity (e.g., drooping, running off, and the like) without having to physically manipulate the assembly. This also allows for complete sealing of the cover plate to the sensing element substrate around the edges with glass or other sealing materials. In addition, by allowing a ledge to be formed around three sides of the cover plate with which to hold the glass slurry used to attach the two, the glass is kept from flowing away from the interface of the two parts.

In addition to the cover plate being wider than the substrate, it is also beneficial for the cover plate to be generally thinner than the sensor substrate. This configuration provides for a reduction in the response time of the sensing element. Since the cover plate is thinner and wider than the portion of the sensing element it covers, the cover plate possesses a larger surface area per unit volume than the corresponding portion of the substrate it covers. This larger surface area per unit volume thus allows heat to be conducted both to and from the sensing element. This factor allows the sensor to reach and then maintain an operational temperature faster than would a plate having a surface area essentially equal to or less than the portion of the substrate it covers. Accordingly, if the cover plate were thicker than the sensing substrate, a wider cover plate could actually slow down the time response since it will have a larger mass than the sensing element.

Further, it has unexpectedly been discovered that by not applying the sealing material (e.g., glass slurry) to at least a portion of the interface between the substrate and the cover plate, at least a portion of a side of the cover plate to substrate interface can be left open. The portion left open is preferably the side of the cover plate that does not form a ledge (i.e., the top portion of the cover plate, which is located on the side opposite the side closest to the sensing element, overhanging the sensing end of the substrate.

The ability to leave a side of the cover plate open is beneficial, because it has been discovered that the sensing element, when placed in fluid communication with an external environment through the unsealed opening, unexpectedly provides a more reliable output signal at high temperature than may be obtained using a completely scaled sensing element at high temperature. In addition, extending the cover plate into or through the sealing material also provides the advantage of strengthening the element, which can break if not of an adequate thickness.

Finally, the ability of the open portion to allow the element to breath while still sealing it from poisoning compounds can be used to detect if there is a leak present in the seals formed around the sealed sides. This process may include isolating the open end 28 of a temperature sensor 10 from the sensing end of the temperature sensor (e.g., packaging the temperature sensor within a housing), followed by exposing the sensing end of a sensing element to a testing gas (e.g., helium) while attempting to sense the testing gas at the open end 28 of the temperature senor 10. Accordingly, if a leak were present in the seal around the cover plate, the sensing gas would travel through the leak (e.g., pin hole) and up the inside of the cover plate to the unsealed portion of the cover plate where the gas would be detected.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting the claims.

What is claimed is:

1. A temperature sensor, comprising:
   a cover plate disposed at a first end of a substrate to form an interface portion;
   a sensing element disposed between the cover plate and the substrate to form an assembly; and
   a housing,
   wherein at least a first portion of the sensing element is disposed in a lower shield capable of fluid communication with a gas to be temperature sensed,
   wherein at least a portion of the cover plate opposite the first portion of the sensing element is disposed in a portion of the housing that is sealed from the lower shield;
   wherein the cover plate and substrate have relative dimensions so as to form a ledge at the first end; and,
   wherein the cover plate is attached to the substrate at the ledge.

2. The temperature sensor of claim 1, wherein the cover plate is attached to the substrate with a seal in at least a first area of the cover plate that will be exposed to a gas to be temperature sensed.

3. The temperature sensor of claim 2, wherein the sensing element is disposed in a spaced relationship with the seal.

4. The temperature sensor of claim 3, wherein the seal comprises a material selected from the group consisting of glass, ceramic, or a combination comprising at least one of the foregoing.

5. The temperature sensor of claim 3, wherein in at least a portion of the sensing element that will not be exposed to the gas to be temperature sensed is in fluid communication with an external environment.

6. The temperature sensor of claim 1, wherein the sensing element is selected from the group consisting of platinum, rhodium, titanium, palladium, and alloys and combinations comprising at least one of the forgoing.

7. The temperature sensor of claim 1, wherein the substrate, the cover plate or both comprise a ceramic material selected from the group consisting of zirconia, alumina, or a combination comprising at least one of the foregoing.

8. The temperature sensor of claim 1, wherein the cover plate has a size that is about 105% to about 150% larger than the substrate at the interface portion.

9. The temperature sensor of claim 1, wherein the cover plate has a thickness of about 10% to about 90% of a thickness of the substrate at the interface portion.

10. The temperature sensor of claim 1, wherein the substrate at the interface portion has a size that is about 105% to about 150% larger than the cover plate.

11. The temperature sensor of claim 1, wherein the cover plate is attached to the substrate with a seal in at least a first area of the cover plate that will be exposed to a gas to be temperature sensed, wherein the seal is disposed in a spaced relation to the sensing element, and wherein in at least a portion of the sensing element that will not be exposed to the gas to be temperature sensed is in fluid communication with an external environment.

12. The temperature sensor package of claim 1, wherein the portion of the cover plate opposite the first portion is disposed in a sealing member disposed between the housing and the assembly.

13. A temperature sensor, comprising:
    a cover plate disposed at a first end of a substrate to form an interface portion;
    a sensing element disposed between the cover plate and the substrate to form an assembly;
    a seal disposed to inhibit fluid communication between the sensing element and a gas to be temperature sensed; and,
    a housing,
    wherein at least a first portion of the sensing element is disposed in a lower shield capable of fluid communication with the gas to be temperature sensed,
    wherein at least a portion of the cover plate opposite the first portion of the sensing element is disposed in a portion of the housing that is sealed from the lower shield; and,
    wherein fluid communication is retained between the sensing element and an external environment.

14. The temperature sensor of claim 13, wherein the portion of the cover plate opposite the portion is disposed in a sealing member disposed between the housing and the assembly.

* * * * *